Sept. 8, 1925.
J. W. JEPSON
ANTISKID DEVICE
Filed May 22, 1922
1,552,434
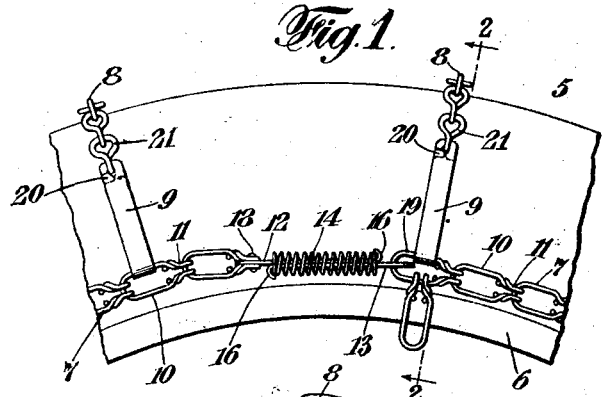
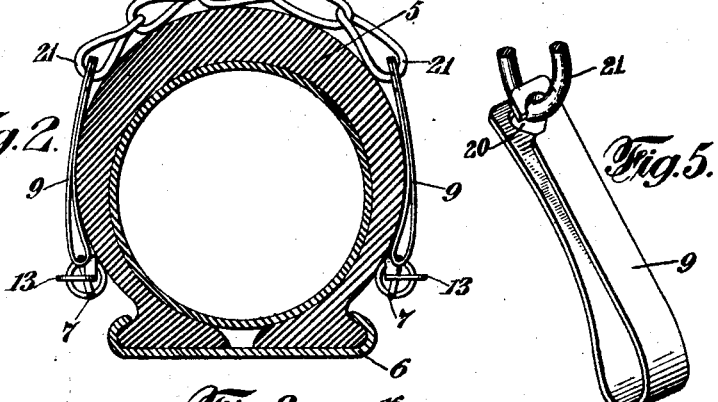
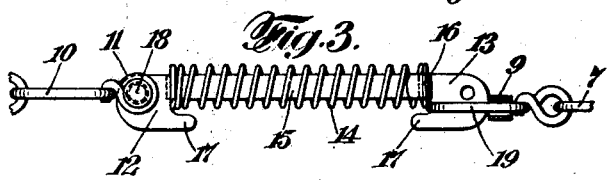
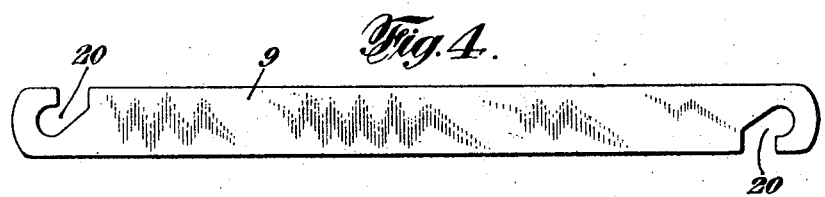
Inventor
John W. Jepson
By his Attorneys
Ward, Crosby & Smith Patented Sept. 8, 1925.

1,552,434

UNITED STATES PATENT OFFICE.

JOHN W. JEPSON, OF ELIZABETH, NEW JERSEY.

ANTISKID DEVICE.

Application filed May 22, 1922. Serial No. 562,570.

*To all whom it may concern:*

Be it known that I, JOHN W. JEPSON, a citizen of the United States, and resident of Hillside, Elizabeth, county of Union, State of New Jersey, have invented certain new and useful Improvements in Antiskid Devices, of which the following is a specification.

My invention relates to improvements in anti-skid devices, more particularly anti-skid chains such as are applied to tires of motor vehicles to prevent skidding. These anti-skid chains are commonly composed of two side members or chains which extend circumferentially of the wheel on opposite sides of the tire near the rim and which are connected at intervals by short transverse cross chains or members which extend over the tread of the tire. In the forms commonly in use, the cross chains wear out rather rapidly and either the whole arrangement must be replaced or else new cross chains put in and connected to the side retaining chains. This ordinarily requires the opening up of the links to remove them from the side chains and likewise means that the ends of the new cross chains which are put in must be bent into place in order that they may be firmly secured to the side chains so that they will not become detached therefrom.

The main object of the present invention is to provide an arrangement by which such cross chains may be more easily replaced and without requiring special tools. A further object is to provide an arrangement in which substantially only the worn links of the cross chains need be replaced thereby decreasing the cost of replacement. Further and more specific objects, features and advantages will more clearly appear from the detail description given below taken in connection with the accompanying sheet of drawings, which forms a part of this specification. In the drawings, Fig. 1 is a side view of a section of an automobile rim and tire showing my improvements in a preferred form applied thereto. Fig. 2 is a section taken on the line 2—2 of Fig. 1. Fig. 3 is a detail of the device for connecting the ends of the side chains shown in Fig. 1. Fig. 4 is a detail illustrating the cross chain connecting link before it has been bent into its final shape, and Fig. 5 is a perspective of the same showing the method of inserting therein or removing therefrom, a cross chain link.

Referring to the drawings, 5 represents a tire and 6 the rim of a vehicle wheel. 7, 7 represent side retainer members composed of side chains which extend circumferentially of the wheel on opposite sides of the tire and 8, 8 represent cross chains which are located at intervals around the tire and are suitably connected to side members or chains 7 by means of links 9.

Any form of side retaining means may be used to hold the cross chains, but in the form shown, the side chains are made up of a series of similar links each having a large loop 10 and reduced eye portions 11 at one end thereof connected to the large loop of the next link. Each fastening device for the ends of the side chains or members comprises a pair of hook members 12 and 13 arranged side by side with a coil spring 14 encircling the same for a greater portion of their length. The two hook members are substantially alike in the form shown in the drawings and stamped from sheet metal. Each of these hooked members includes a narrow flat shank portion 15, one end of which is bent over and back parallel to the main portion of the shank to form a bearing shoulder or stop at 16 for the ends of the spring 14. At the opposite end each hook member is provided with a flat hook 17, the hook 17 on the member 13 being adapted to engage the large loop of the end link on one end of the chain 7 as shown in Figs. 1 and 3. If desired, the hook 17 on link 12 may be similarly engaged with the other end link of side chain 7 or it may be connected to the side chain by means of pivot pin 18 passing through the small eye portion of the end link. In order to detach the retainer, it is only necessary to compress the spring 14 when the hook 17 on member 13 may be easily disengaged from the end link of the side chain and by similarly compressing the spring 14, the hook 17 on member 13 may be easily re-engaged with the end link 19 of the side chain. If the side chain is of such length that it is under tension when attached in the manner stated, the device will securely hold the ends of the side chains in proper position because the tension of the spring 14 will tend to pull the ends of the side chain together and prevent the end link 19 from being disengaged from the hook 17 in member 13. If, however, the chain slackens up in use or should the chain be slack when applied, the spring 14 will expand and assume the position shown in Fig. 3 with one end of the spring bearing against the end link 19 preventing disengagement of the link except by forcibly compressing the spring.

The hook member 13 may be hooked into any one of the loops 10 of the side chains so as to make the device fit different sizes of wheels. In Fig. 1 it is shown hooked into the second link of side chain 7, the first link being shown as hanging loose.

The links 9 which are adapted to connect the cross chains with the side chains are each made up of relatively flat metallic strips as shown in Fig. 4 and each bent or doubled upon itself as shown in Fig. 2. The ends of the strip have opposing lateral recesses as indicated at 20. In the preferred embodiment of the invention these links 9 pass through and are thereby connected with one of the side chain links respectively with the ends of the link 9 extending radially outwardly and with the recesses 20 engaging the end links of the cross chains 8 respectively. The members 9 are made of resilient or spring metal and by giving the end links 21 a twisting motion, as shown in Fig. 5, the ends of the link 9 may be spread apart and disengaged from the links 21. After being disengaged from the end links 21, the links 9 may be easily slipped off from the side chain links 10. Since the links 9 are made of spring metal, the ends thereof may be pressed apart sufficient for this removal without permanently distorting the same since they immediately spring back into place with the ends lying flat against one another when the pressure exerted to pry them apart is removed. The construction of the links 9 is such that the ends thereof may be thus pressed apart by hand with or without the aid of any simple tool such as a screw driver. In a similar manner the operation may be reversed, and the links 9 slipped on to the side chain links and the end links 21 of the cross chains connected to the upper ends of the links 9 by slightly separating the ends of the links 9 and then slipping the end links 21 into the recesses 20, whereby the links 9 have a resilient snap engagement with the chain links 21. In other words, the links 9 are so constructed that the ends thereof may be sprung into locked engagement with a chain link and sprung out of engagement with a chain link without permanent distortion of the member 9.

It will thus be seen that by using this form of removable link 9, the cross chains 8 may be easily replaced without the use of special tools and furthermore it is only necessary to replace the worn portion of the cross chains and several cross chain links are saved since it is not necessary to replace the links 9. That is, in replacing the cross chains 8, it is only necessary to replace a few links, i. e., the ones which receive wear on the tread of the tire. Furthermore in view of the resilient snap action connection of the links 9 there is no danger of the chains falling apart or the cross chains becoming disconnected when not in use or when the parts are slack. Furthermore by reason of the flat construction of the link 9, the tire or shoe on the wheel is less likely to become damaged when run against various obstructions, such as street curbs, etc.

While I have described my improvements in great detail and with respect to a preferred form thereof, I do not desire to be limited to such detail or form since many changes or modifications may be made and the invention embodied in widely different forms without departing from the spirit and scope thereof in its broader aspects.

What I claim as new and desire to secure by Letters Patent is:

1. An anti-skid arrangement having side retaining chains and a plurality of cross chains, with links for connecting the ends of the cross chains with the side chains, said links each comprising a flat member bent double and with its ends cut away to removably receive and be connected to a chain link.

2. An anti-skid arrangement having side retaining means and cross chains with links for connecting the cross chains to the side retaining means, said links each comprising a relatively flat strip doubled upon itself and having opposing lateral recesses in its ends for removable engagement with a chain link.

3. An anti-skid arrangement having side retaining means and cross chains with links for connecting the cross chains to the side retaining means, said links each comprising a relatively flat member having a resilient snap engagement with a chain link whereby the member may be attached and detached without permanent distortion thereof.

4. An anti-skid cross chain having cross chain links and a link for connecting the same to one side retaining means, said last mentioned link comprising a looped flat member having opposing lateral recesses in its ends for removable engagement with a chain link.

5. An anti-skid arrangement having circumferential side chains, and cross chains each comprising a plurality of tread wearing links, and links for connecting said cross chain links to said side chains, said connecting links each comprising a relatively flat strip doubled upon itself having one end connected to the said cross chain links and its other end directly connected to the side chain.

6. An anti-skid arrangement having side retaining means, and cross chains each comprising a plurality of tread wearing links, and links for connecting said cross chain links to said side retaining means, said connecting links each comprising a relatively flat strip slotted at both extremities and doubled upon itself and having one end connected to said cross chain links and its other end connected to said side retaining means.

7. An anti-skid arrangement having side retaining means, and cross chains each comprising a plurality of tread wearing links, and links for connecting said cross chain links to said side retaining means, said connecting links each comprising a relatively flat member bent substantially double and with its ends slotted to form a removable connection.

8. An anti-skid arrangement having side retaining means, and cross chains each comprising a plurality of tread wearing links, and links for connecting said cross chain links to said side retaining means, said connecting links each comprising a relatively flat member doubled upon itself and having lateral opposed recesses in its adjacent ends, engaging the end link of said tread wearing links, and the other end of said member engaging the side retaining means, and said member being resilient whereby the ends thereof may be sprung into and out of locked engagement with said end tread wearing link without permanent distortion thereof.

9. An anti-skid arrangement having side retaining means, and cross chains each comprising a plurality of tread wearing links, and links for connecting said cross chain links to said side retaining means, said connecting links each comprising a member doubled upon itself and having lateral opposed recesses in its adjacent ends, engaging the end link of said tread wearing links, and the other end of said member engaging the side retaining means, and said member being resilient whereby the ends thereof may be sprung into and out of locked engagement with said end tread wearing link without permanent distortion thereof.

In testimony whereof I have signed my name to this specification.

JOHN W. JEPSON.